(12) United States Patent
Roth

(10) Patent No.: US 8,233,740 B2
(45) Date of Patent: Jul. 31, 2012

(54) SYSTEM AND METHOD FOR CONSTRUCTING PHOTOREALISTIC MOSAICS

(76) Inventor: Alan Steven Roth, San Francisco, CA (US)

( * ) Notice: Subject to any disclaimer, the term of this patent is extended or adjusted under 35 U.S.C. 154(b) by 1092 days.

(21) Appl. No.: 11/963,347

(22) Filed: Dec. 21, 2007

(65) Prior Publication Data
US 2008/0260202 A1 Oct. 23, 2008

Related U.S. Application Data

(60) Provisional application No. 60/877,087, filed on Dec. 26, 2006.

(51) Int. Cl.
*G06K 9/36* (2006.01)
*G09G 5/00* (2006.01)
*H04N 9/74* (2006.01)
*H04N 9/75* (2006.01)
*H04N 9/76* (2006.01)

(52) U.S. Cl. .......................... 382/284; 345/629; 348/584

(58) Field of Classification Search ........................ None
See application file for complete search history.

(56) References Cited

U.S. PATENT DOCUMENTS 8,086,077 B2 * 12/2011 Eichhorn ...................... 382/305

OTHER PUBLICATIONS

AndreaMosaic, Dec. 20, 2005, p. 1-6, "http://www.andreaplanet.com/andreamosaic/tutorial/", copy from wayback machine of www.archive.org.*
Goldberg et al. "A Global Approach to Automatic Solution of Jigsaw Puzzles", 2002, SoCG 20, Jun. 5-7, pp. 82-87.*

* cited by examiner

*Primary Examiner* — Randolph I Chu
(74) *Attorney, Agent, or Firm* — Kauth, Pomeroy, Peck & Bailey LLP (57) ABSTRACT

Systems and methods for constructing photorealistic mosaics are described. One embodiment of the invention includes capturing an image of a sheet that includes a plurality of pieces of material, determining the location of each piece of material on the sheet from the captured image, extracting images of each piece of material on the sheet from the captured image, storing an image of each piece of material and information concerning the location of the piece of material in a database and using the images in the database and the target image to identify pieces of material to be used in the construction of the photorealistic mosaic.

11 Claims, 12 Drawing Sheets

|   | 1 | 2 | 3 |
|---|---|---|---|
| 1 | ■ S550 ↑ R7 C2 | ■ S518 ← R16 C6 | ■ S510 ↑ R5 C4 |
| 2 | ■ S504 ↑ R8 C6 | ■ S504 ↑ R12 C5 | ■ S522 ↑ R16 C4 |
| 3 | ■ S518 ↑ R16 C2 | ■ S532 → R11 C5 | ■ S553 ↑ R14 C5 |
| 4 | ■ S543 ← R9 C3 | ■ S530 ↑ R18 C2 | ■ S562 ↑ R5 C4 |
| 5 | ■ S507 ↑ R15 C7 | ■ S549 ↑ R12 C9 | ■ S525 ↑ R3 C9 |
| 6 | ■ S498 ↑ R17 C3 | ■ S562 ↑ R7 C1 | ■ S486 ↑ R14 C5 |
| 7 | ■ S548 ↑ R15 C3 | ■ S561 ↑ R2 C3 | ■ S551 ↑ R8 C2 |

SYSTEM AND METHOD FOR CONSTRUCTING PHOTOREALISTIC MOSAICS

CROSS REFERENCE TO RELATED APPLICATION

This application claims priority to Provisional Application No. 60/877,087 filed Dec. 26, 2006, the disclosure of which is incorporated herein by reference.

BACKGROUND

The present invention relates generally to the construction of mosaics and more specifically to the construction of photorealistic mosaics.

Techniques have been developed that enable the construction of an image using a mosaic of small images. The processes typically involve using photographs as the small images and combining the photographs to form a larger image. From a distance, the small images appear as pixels of color. As a viewer approaches the image, the viewer is able to resolve each of the pixels as a separate image. Creation of images using a mosaic of smaller images typically involves the use of computer software that divides a target image (i.e. an image that is to be recreated by the mosaic) into regions and that locates the smaller image, which is the best fit for each region. The process can be entirely automated and the photorealistic nature (i.e. the resemblance of the mosaic to the target image) of the mosaic depends upon the effectiveness of the process in matching smaller images to regions of the target image and the inventory of available smaller images. In many instances, the software can reuse images to improve the photorealism of the resulting mosaic.

SUMMARY OF THE INVENTION

Systems and processes are described for the manual construction of a photorealistic mosaic using pieces of material. In a number of embodiments, the pieces include variations in color and sub-regions of each piece of material are compared to sub-regions of the target image in order to improve the photorealism of the resulting mosaic. In several embodiments, the process incorporates aspects that increase the efficiency of the manual construction of the photorealistic mosaic. In many embodiments, an inventory of pieces of material is developed and the process draws from a database of information concerning the inventory during the development of an assembly plan for the photorealistic mosaic.

One embodiment of the invention includes capturing an image of a sheet that includes a plurality of pieces of material, determining the location of each piece of material on the sheet from the captured image, extracting images of each piece of material on the sheet from the captured image, storing an image of each piece of material and information concerning the location of the piece of material in a database and using the images in the database and the target image to identify pieces of material to be used in the construction of the photorealistic mosaic.

In a further embodiment, the pieces of material are arranged on the sheet in a regular array.

In another embodiment, capturing an image of a sheet of material further includes capturing an image of the sheet of material using a flat bed scanner.

In a still further embodiment, capturing an image of a sheet of material further includes capturing an image of the sheet of material using a digital camera.

In still another embodiment, determining the location of each piece of material on the sheet from the captured image further includes creating a segmentation image from the captured image and determining unique regions within the captured image using the segmentation image.

In a yet further embodiment, determining the location of each piece of material on the sheet from the captured image further includes determining the average area of each unique region, discarding unique regions that have an area that are less than a predetermined ratio of the average area and identifying the remaining unique regions as pieces of material.

In yet another embodiment, extracting images of each piece of material on the sheet from the captured image further includes determining the boundaries of each identified piece of material and capturing an image that encompasses at least the boundaries of the identified piece of material.

In a further embodiment again, extracting images of each piece of material on the sheet from the captured image further comprises straightening the image.

In another embodiment again, storing an image of each piece of material and information concerning the location of the piece of material in a database further includes storing information in the database concerning the sheet on which the piece of material is located and information identifying the location of the piece of material on the sheet.

In a further additional embodiment, storing an image of each piece of material and information concerning the location of the piece of material in a database further includes storing multiple images of the piece of material, where each image is an image of the piece of material with a different orientation.

Another additional embodiment includes creating a database of images of an inventory of pieces of material, dividing the target image into an array of regions, comparing at least a subset of the images in the database with each region, selecting a piece of material for each region based upon the comparisons, and developing an assembly plan for retrieving pieces of information from the inventory and using them in the construction of the photorealistic mosaic of the target image.

In a still yet further embodiment, dividing the target image into an array of regions further includes scaling the target image.

In still yet another embodiment, dividing the target image into an array of regions further comprises dividing the target image into a regular array of regions.

In a still further embodiment again, the target image into an array of regions further includes performing edge detection to define lines within the target image, and dividing the target image into an array of regions, where the array includes boundaries between regions that follow the lines defined within the target image. In still another embodiment again, comparing at least a subset of the images in the database with each region further includes selecting a region of the target image, defining a sub-region within the region of the target image, selecting an image of a piece of material from the database and comparing the sub-region of the target image with the corresponding portion of the image of a piece of material.

In still another embodiment again, comparing the sub-region of the target image with the corresponding portion of the image of a piece of material further includes determining the root mean square error for each of the color components of the sub-region of the target image and the corresponding portion of the image of the piece of material.

In a still further additional embodiment, comparing at least a subset of the images in the database with each region further includes defining multiple sub-regions for each region of the target image, repeating the comparison of each sub-region to each corresponding portion of the image of the piece of material, and recording information concerning the overall match between the region of the target image and the image of the piece of material.

In still another additional embodiment, selecting a piece of material for each region based upon the comparisons further includes determining the region and the piece of material that are the closest match, selecting the piece of material, removing the selected piece of material from the available pieces and determining which of the remaining regions and available pieces of material is the closest match.

A yet further embodiment again includes creating a database of images of an inventory of pieces of material and information concerning the location of the pieces of material within an inventory of pieces of material, using the images in the database and the target image to select pieces of material to be used in the construction of the photorealistic mosaic of the target image and creating instructions for retrieving pieces of material from an inventory and for placing the pieces of material in the photorealistic mosaic.

In yet another embodiment again, creating instructions for retrieving pieces of material from an inventory and for orienting and placing the pieces of material in the photorealistic mosaic further comprises creating at least one document that includes information concerning a subset of pieces of material to be used in the construction of the photorealistic image, the location of the pieces of material within the inventory, the placement of each piece of material within the photorealistic mosaic and the orientation with which each of piece material is to be placed within the photorealistic mosaic.

In a yet further additional embodiment, creating instructions for retrieving pieces of material from an inventory and for orienting and placing the pieces of material in the photorealistic mosaic further includes dividing the photorealistic mosaic into subsections and creating an assembly plan for each subsection.

In yet another additional embodiment, the assembly plan for each subsection includes an array of images of pieces of material, information concerning the location of each piece of material within the inventory and information concerning the orientation of each piece of material.

A further additional embodiment again includes capturing an image of a sheet of a plurality of pieces of material, determining the location of each piece of material on the sheet from the captured image, extracting images of each piece of material on the sheet from the captured image, storing an image of each piece of material and information concerning the location of the piece of material in a database, dividing the target image into an array of regions, comparing at least a subset of the images in the database with each region by defining sub-regions within each region of the target image and comparing each sub-region with the corresponding portion of the image of each piece of material in the subset, selecting a piece of material for each region based upon the comparisons, and creating instructions for retrieving pieces of material from an inventory and for placing the pieces of material in the photorealistic mosaic.

A further additional embodiment includes an inventory of pieces of material, a database describing the inventory of material, and a computer configured to construct an assembly plan for a mosaic by matching images of pieces of material from the database with regions of the target image.

DETAILED DESCRIPTION OF THE INVENTION

Turning now to the drawings, systems and methods for constructing photorealistic mosaics in accordance with embodiments of the invention are shown. A photorealistic mosaic is a mosaic constructed from physical materials that bears a high degree of similarity to a source image. Photorealistic mosaics can be constructed from pieces of any physical material including different types of material, irregularly shaped pieces of material and pieces of material with variations in color across their surfaces. Photorealistic mosaics can be installed as pieces of art, and/or in any application where mosaics are commonly installed including, but not limited to, installations in pools, wall installations, floor installations, mantle installations, bathroom installations, memorials and headstones, outdoor public art installations, and backings for manmade waterfall sculptures.

Processes for creating photorealistic mosaics in accordance with embodiments of the invention typically involve four main steps. The first step involves scanning the physical materials to create an image database of available materials. The second step involves selecting a source image, which the photorealistic mosaic is intended to reproduce. The third step involves choosing materials from the database and assigning the materials with locations and orientations within the mosaic. During the third step, a proof image of the mosaic can be generated to verify achievement of a sufficient level of resemblance between the source image and the mosaic. In many instances, the proof image is used to change the target image in some way. For example, the proof image may prompt an operator to change the contrast, colors and/or darken/lighten sections of the target image. Following the modification of the target image, the process can be repeated until the proof is satisfactory. The fourth involves the actual construction of the mosaic using the selected materials. Processes for constructing photorealistic mosaics in accordance with embodiments of the invention are discussed further below.

Photorealistic Mosaics

Figure 1:
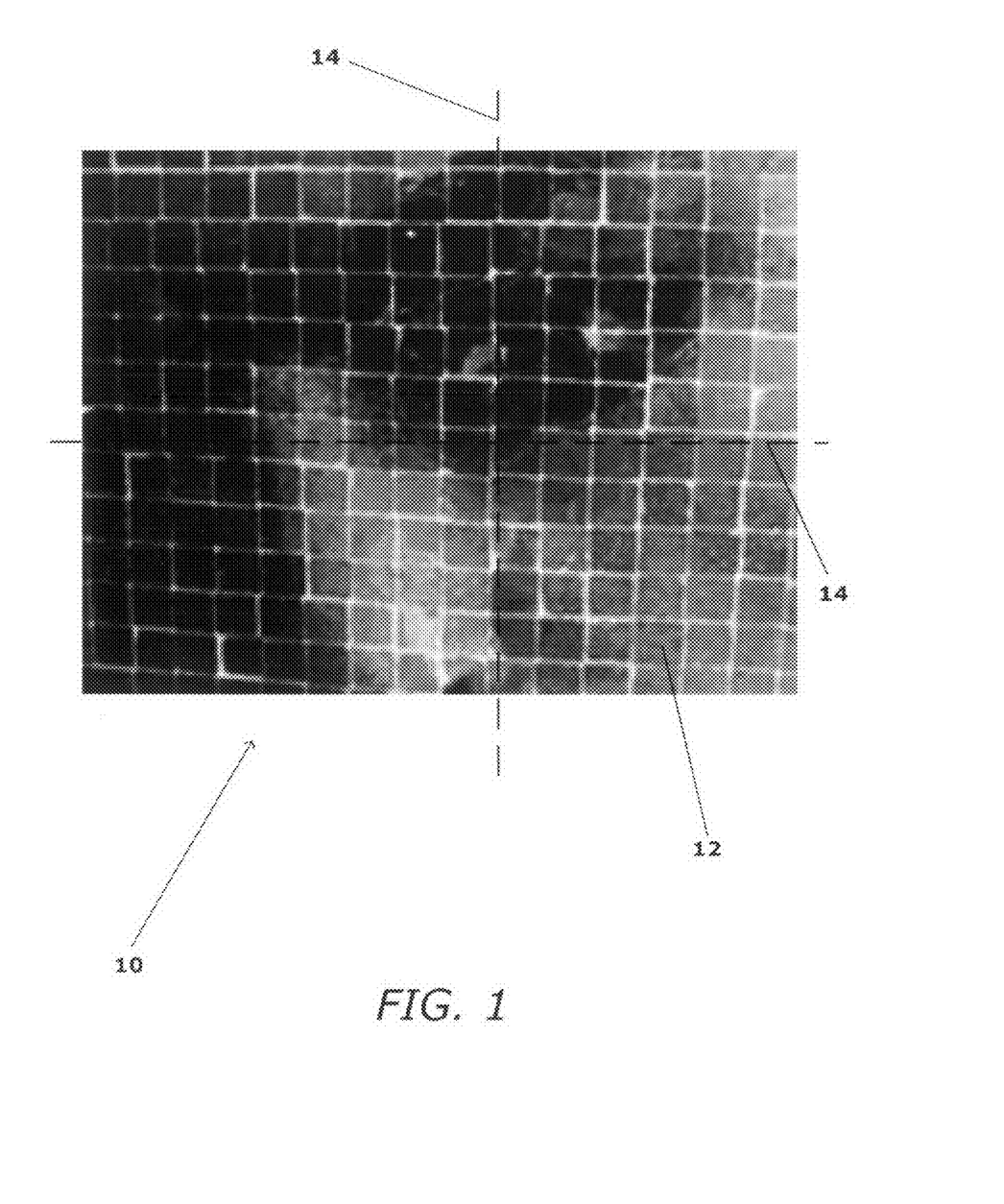
FIG. 1 is a photograph of a portion of a photorealistic mosaic in accordance with an embodiment of the invention.

A portion of a photorealistic mosaic in accordance with an embodiment of the invention is shown in FIG. 1. The photorealistic mosaic 10 is constructed using pieces of a physical material 12. In the illustrated embodiment, the pieces of physical material are tiles that possess texture and variations in color and grain pattern. Although much of the following discussion refers to tiles, the materials that can be used to construct photorealistic mosaics in accordance with embodiments of the invention are not limited to tiles. For example, photorealistic mosaics can be constructed from marble, wood, ceramic, glass, and/or any other physical material or combinations of physical materials.

A comparison of the arrangement of the pieces of material shown in FIG. 1 and perpendicular grid lines 14 reveals that the tiles, although substantially square, are not arranged in a regular grid pattern. Many of the tiles are rotated slightly in order to increase the photorealistic nature of the mosaic. Although the arrangement shown in FIG. 1 is irregular, embodiments of the invention can include regular arrangements. Photorealistic mosaics can also be constructed using physical materials having irregular shapes. Processes for selecting and positioning tiles in order to create a photorealistic mosaic are discussed further below.

Processes for Constructing Photorealistic Mosaics

Figure 2:
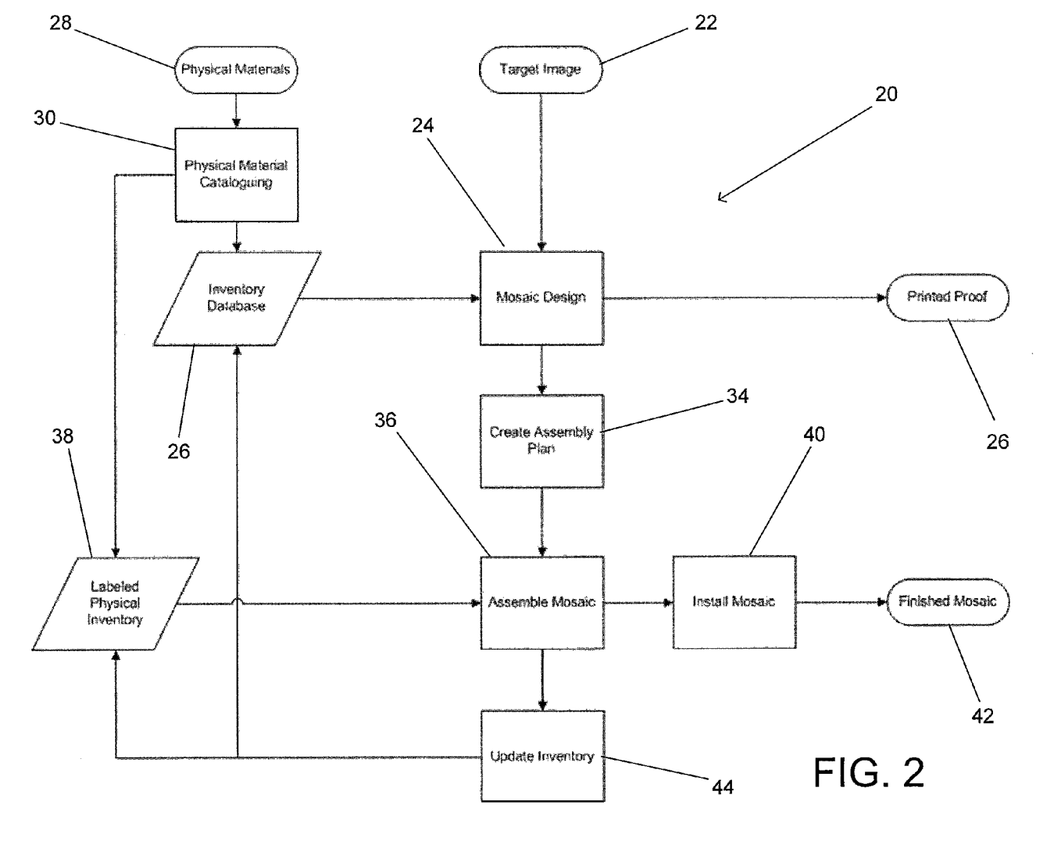
FIG. 2 is a flow chart showing a process for constructing a photorealistic mosaic in accordance with an embodiment of the invention.

A process for constructing photorealistic mosaics in accordance with an embodiment of the invention is shown in FIG. 2. The process 20 commences with the selection (22) of an image. A mosaic design is created (24) using a database (26) containing an inventory of available mosaic material and the mosaic design can be used to create (26) a proof image. The proof image can be used to evaluate whether a mosaic constructed from the inventory of available pieces of material possesses a sufficiently high level of photorealism.

In a number of embodiments, the inventory database is formed by selecting (28) physical materials, cataloging (30) the physical materials and including images of the physical material in a database. Creation of a catalog of images enables the process to be scaled. Multiple photorealistic mosaics can be constructed from a single large inventory of mosaic materials. The cataloging of physical materials and the creation of a database of images is discussed further below.

When a mosaic design is complete, an assembly plan is created (34) and the plan is used to assemble (36) a mosaic from the available inventory of material (38). The assembly plan is a set of documents that provide directions for retrieving pieces of material from the inventory and using them to construct a photorealistic mosaic resembling the target image. The completed mosaic can then be installed (40) and finished to create the finalized mosaic (42). As the mosaic is created or following the completion of the mosaic, the inventory of available physical materials is updated (44) to reflect removal of pieces of material for use in the mosaic.

Creating a Database of Physical Materials

Figure 3A:
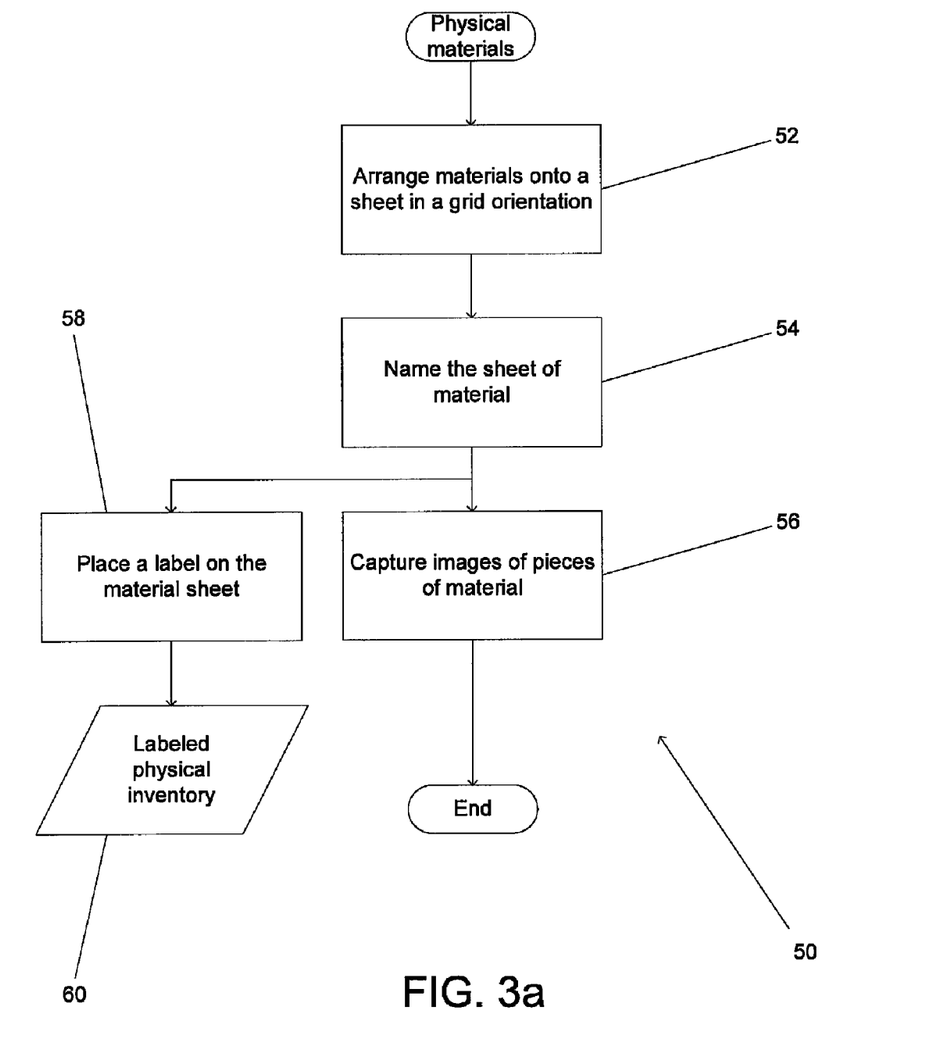
FIGS. 3a-3d are flow charts showing processes for creating an inventory of pieces of material and a database of information concerning the inventory in accordance with an embodiment of the invention.

Construction of a photorealistic mosaic relies on the availability of a database of information concerning materials that can be used in the construction of the mosaic. Processes that can be used in the construction of a database of information concerning available pieces of material are shown in FIGS. 3a-3d. A process for scanning pieces of material is illustrated in FIG. 3a. The process 50 starts with a collection of pieces of material that are arranged (52) onto a sheet in a grid orientation. A name is assigned (54) to the sheet of material and an image is captured (56) of the pieces of material on the sheet. The sheet is labeled (58) and placed in an inventory of materials (80) for Later retrieval. In a number of embodiments, the sheets are scanned using a high resolution flat bed scanner. In other embodiments, the sheets can be photographed using a high resolution digital camera. Depending upon the environment, any of a number of imaging technologies can be used to capture images of sheets of pieces of material in accordance with embodiments of the invention.

An advantage of capturing sheets of material is that the physical effort required to align pieces of material and capture images of the pieces of material is reduced. By capturing a single image including multiple pieces of material, the physical effort can be replaced with computational effort. As is discussed below, image processing techniques can be applied to each sheet in order to identify the pieces of material on each sheet and to extract appropriately aligned images of each piece of material.

Figure 3B:
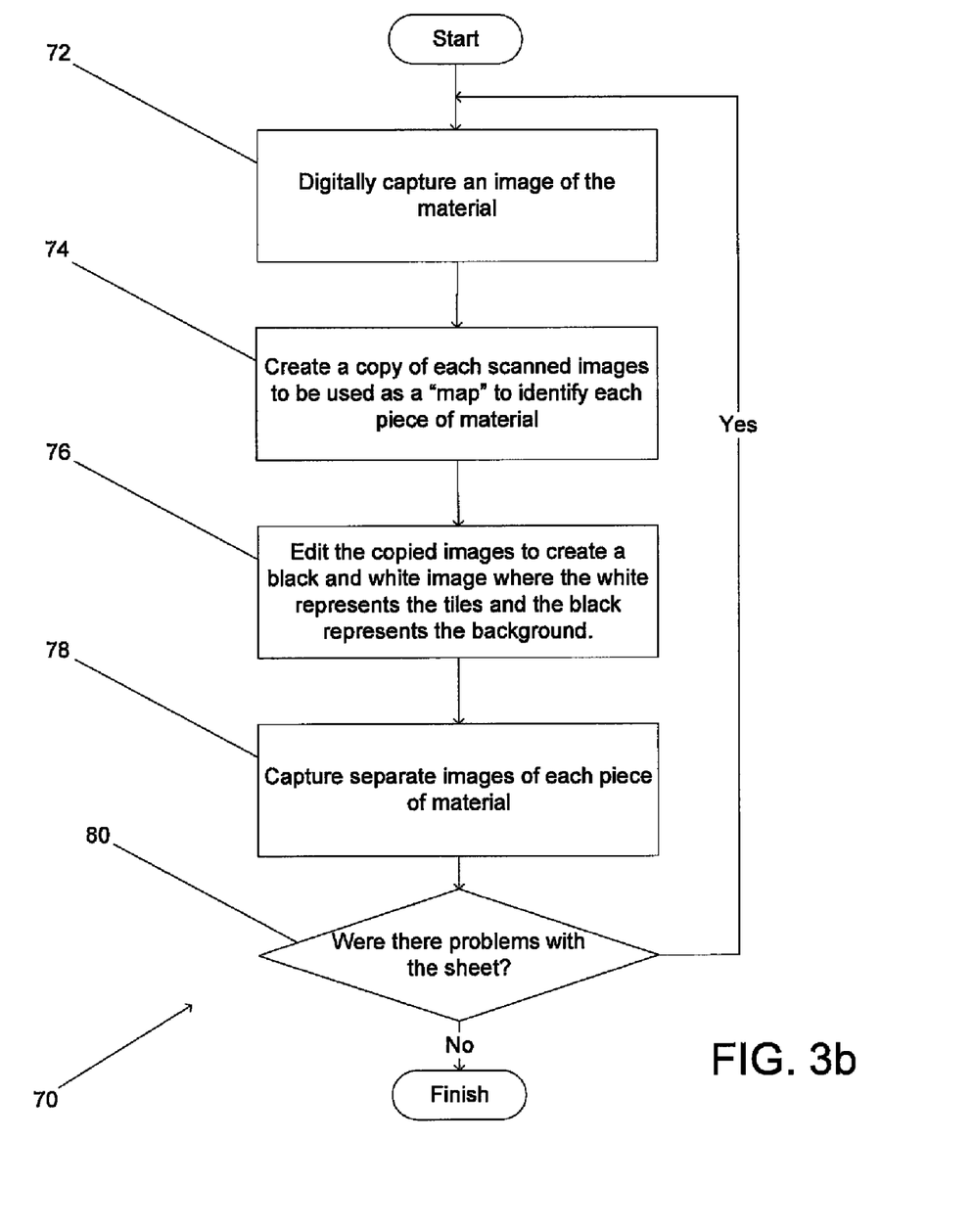
Figure 3C:
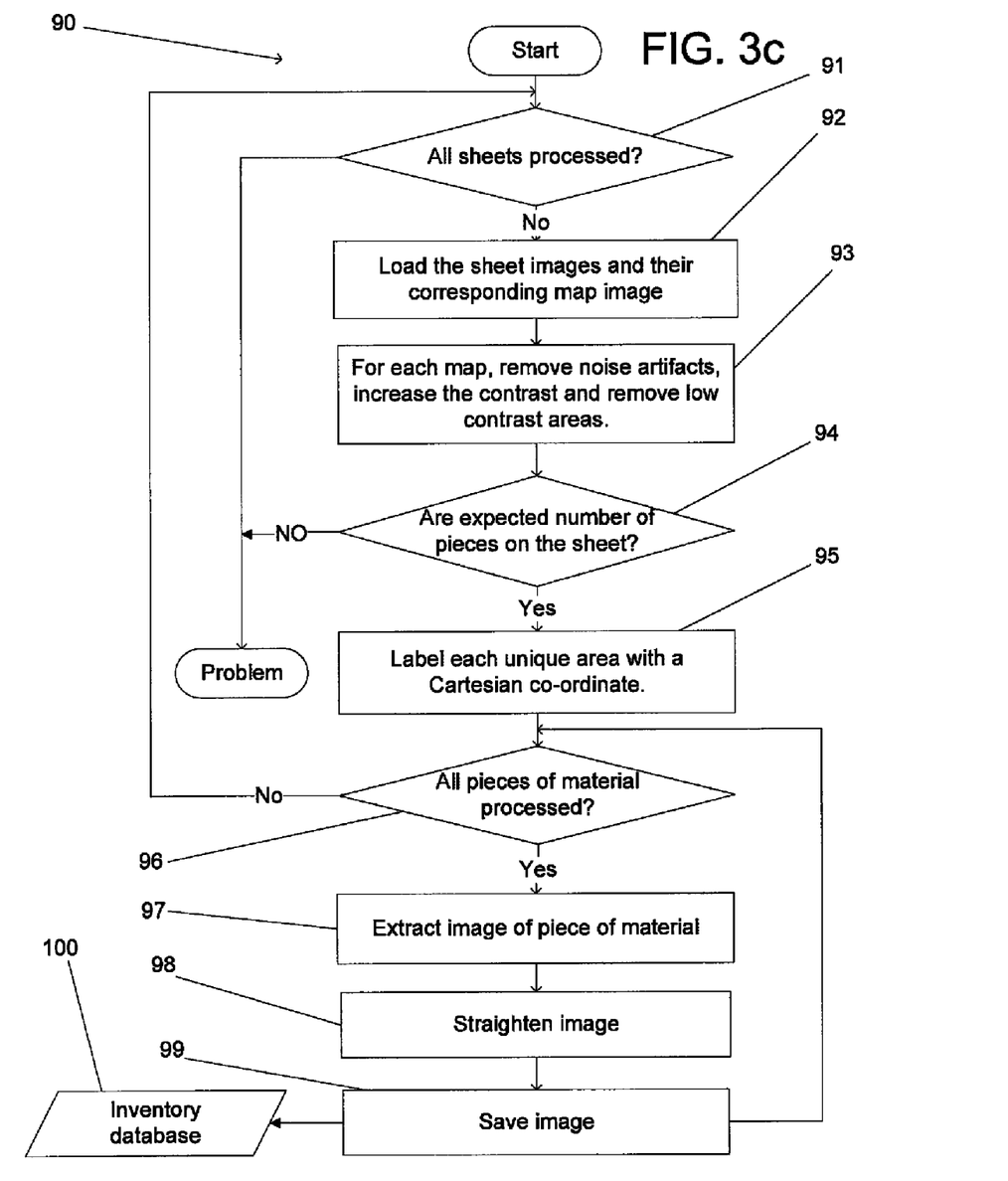

A process for extracting individual images of pieces of material from an image of a sheet of material in accordance with an embodiment of the invention is shown in FIG. 3b. The process 70 includes digitally capturing (72) an image of the sheet of material and creating (74) a copy of the scanned image to be used as a map to identify each piece of material on the sheet from the inventory. The map image is edited (76) to create a black and white image where the white represents the pieces of material and the black represents the background. The high contrast image is useful in identifying the boundaries of the pieces of material and, as is discussed further below, with correcting for misalignment of the material. The black and white image is one example of a segmentation or alpha transparency image. In other embodiments, other types of segmentation images can be used. Separate images of each of the pieces of material are captured (78) and a determination made as to whether there were any problems with capturing an image of the sheet. In the event that there was a problem, then the process repeats. Otherwise, the image capture process is complete.

Figure 3D:
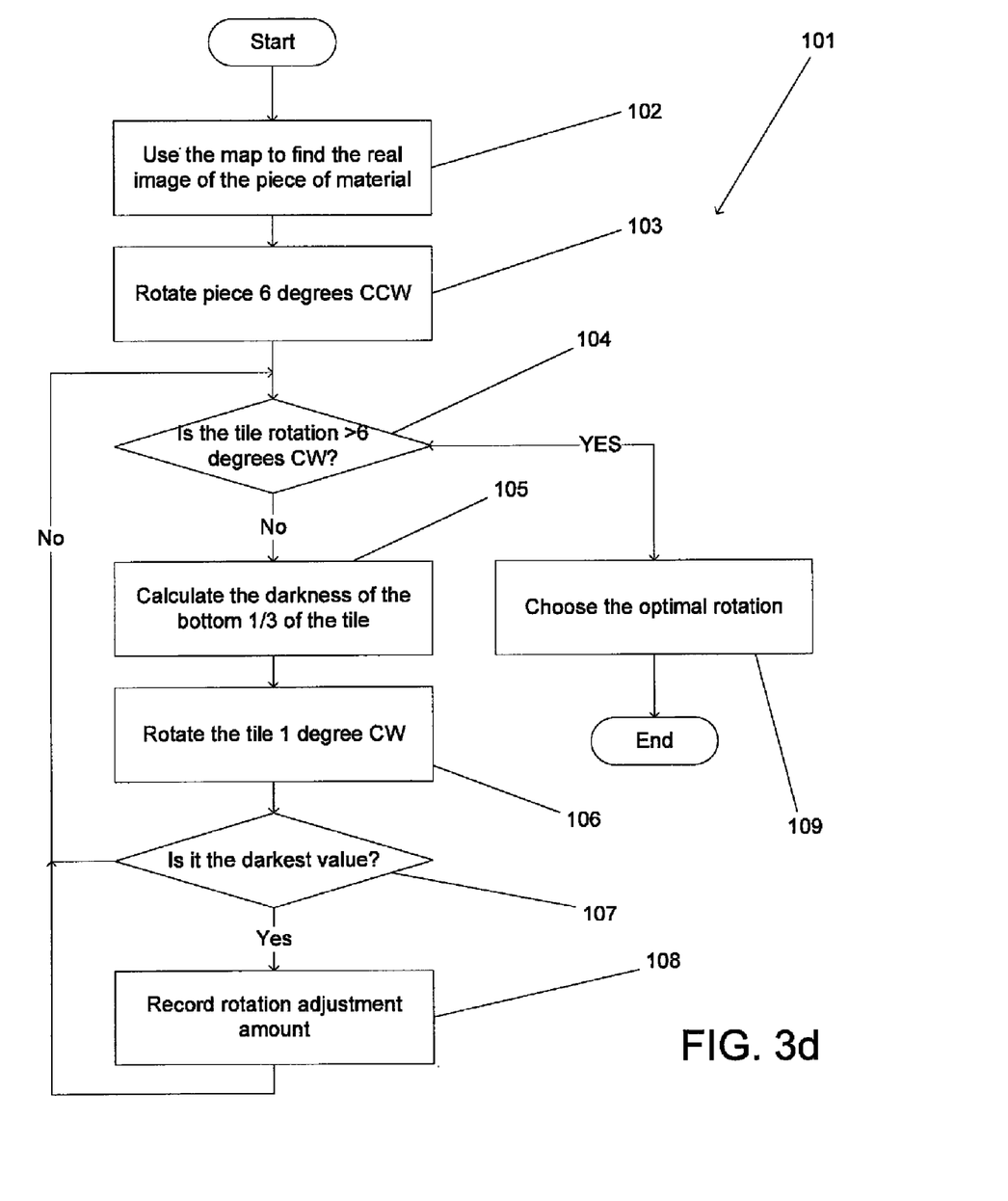

A process for capturing separate images of each of the pieces of material from an image of a sheet of pieces of material is shown in FIG. 3d. In the illustrated embodiment, all sheets of material are processed in a batch. In other embodiments, the sheets of material can be processed separately. The process 90 involves a determination (91) as to whether there are any more sheets to process. In the event that all of the sheets have been processed, then the process is complete. When sheets remain to be processed, the sheet image and corresponding map image are loaded (92). Noise artifacts are removed from each of the map images, the contrast is increased and low contrast areas are removed (93) to more clearly define the edges of each piece of material. The number of pieces of material on the sheet and a determination (94) made as to whether the expected number of pieces is on the sheet. In many embodiments, the identification of pieces of material involves determining the average area (or median area) of unique areas within the map usage and discarding unique areas that are less than a predetermined ratio of the average. When the number of pieces differs from the expected number, a problem has occurred and an operator typically intervenes. When the numbers match, each unique area (i.e. a white shape surrounded by black borders) in the image is labeled (95) with a Cartesian coordinate (assuming the pieces are arranged in rows and columns). In other embodiments, other appropriate coordinate systems can be used to label the unique shapes. An image of each piece is extracted (97) from the image of the sheet. The extracted image is typically straightened (98), cropped and saved (99) in an inventory database (100). The process repeats until a determination (96) is made that an image of each piece of material on the sheet has been saved in the inventory database (100). At which point, the process checks to see whether there is another sheet to process.

The high contrast of the map image is useful for a variety of signal processing algorithms including image alignment. A process for straightening images of rectangular pieces of material in accordance with an embodiment of the invention is shown in FIG. 3d. The process 101 involves using (102) the map image to identify a piece of material. The map image of the identified piece of material is then rotated 6 degrees counter clock wise. The darkness of the bottom ⅓ of the image of the piece of material is then calculated (105) through a series of a 1 degree clockwise rotations (106) and the rotation adjustment determined (107) to yield the darkest value is recorded (108) until the map image has been rotated more than 6 degrees in a clockwise direction relative to the map image's original orientation. At which point, the rotation that provided the darkest value is recorded as the rotation at which the edges of the pieces of material are aligned with the borders of the image. Although a specific detection technique involving rotations over a 12 degree range is described above, straightening can be performed using any of a variety of algorithms and using an algorithm that operates over a larger or smaller range of rotations.

Although specific processes are described above for the capturing of images of pieces of material using a high contrast map image. In other embodiments, other signal processing techniques can be used to create an inventory database of images of pieces of material using images containing multiple pieces of material.

Selecting Physical Materials to Construct a Photorealistic Mosaic

Figure 4A:
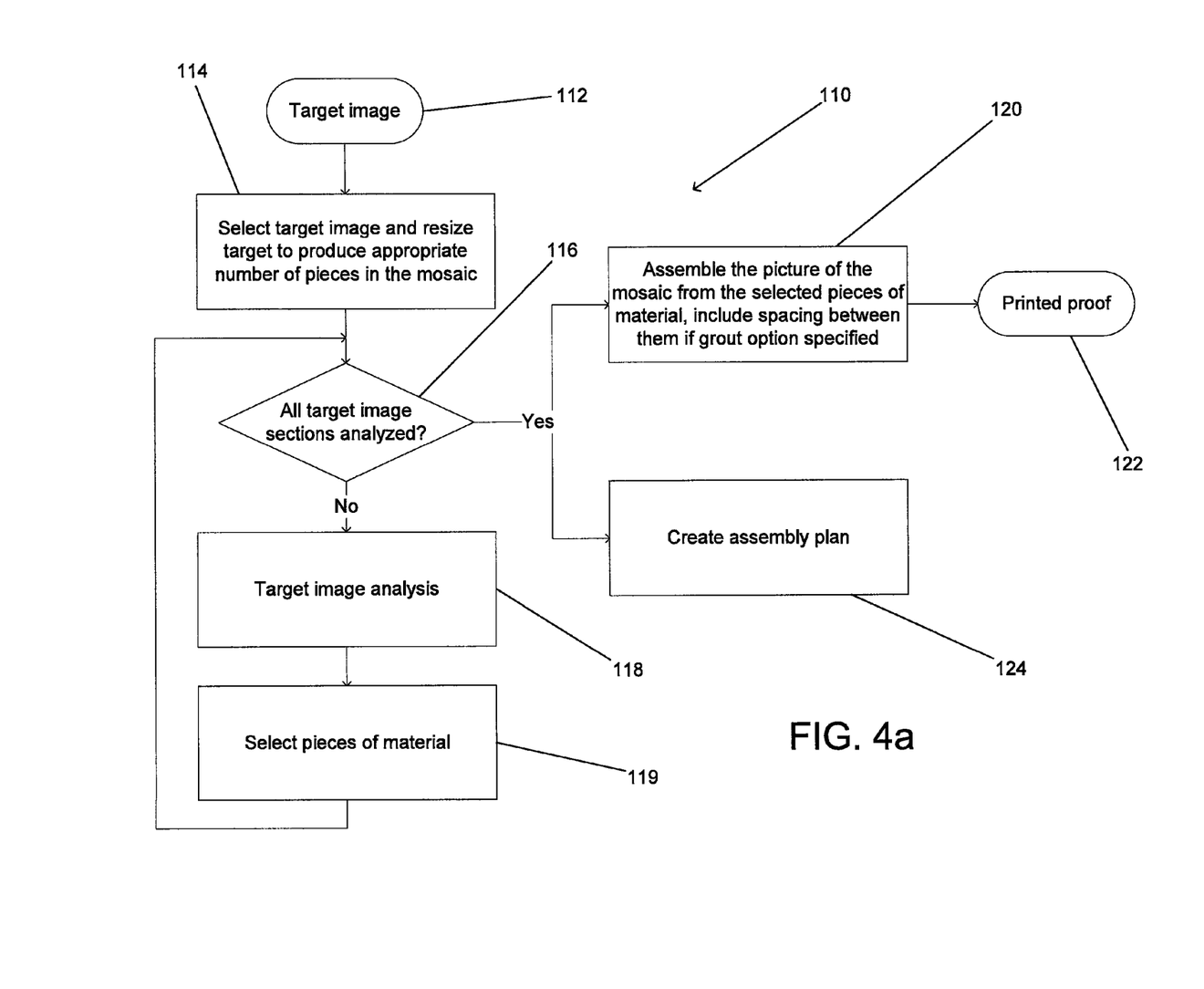
FIGS. 4a-4d are flow charts showing processes for selecting pieces of material for use in the construction of a photorealistic mosaic in accordance with an embodiment of the invention.

Once an inventory of materials and a corresponding database of images of each of the pieces of material have been created, the inventory and the database can be used to produce a photorealistic mosaic. Processes for selecting materials from an inventory for use in a photorealistic mosaic are shown in FIGS. 4a-4d. A process for constructing a photorealistic mosaic of a target image is shown in FIG. 4a. The process 110 involves selection (112) of a target image, which is resized (114) to provide dimensions appropriate to the sizes of the pieces of material and the number of pieces of material that are to be used in the photorealistic mosaic. The target image is then analyzed (118) and pieces of material selected (119) until a determination (116) is made that the entire image has been analyzed. The analysis that is performed can vary depending upon the manner in which pieces of material are to be arranged. In a number of embodiments, the pieces of material are arranged in a regular array. In other embodiments, edge detection algorithms or other algorithms are applied to the target image to identify curved lines in the target image that can be used to form the basis of an irregular array. Once the image has been analyzed, the images of the pieces of material that have been selected by the process can be combined (120) into a proof image of the photorealistic mosaic. The manner in which the images are assembled often depends upon the nature of the mosaic. In mosaics that include grout lines, the target image is divided into regions that are separated by the width of the grout lines effectively pixels of the target image are skipped over where there are grout lines). In mosaics that do not include grout lines, the target image is divided into regions that are not separated and each pixel of the target image is analyzed when selecting pieces of material. The selected pieces of material are also used to generate (124) an assembly plan. The photorealistic qualities of a mosaic is largely dependent on the process used to analyze a target image and select pieces of material from the inventory. In many embodiments, the resolution of the image is increased by using pieces of material that have various colors distributed across their surfaces. Each piece of material can be divided into sub-region and each piece of material sub-region compared to a corresponding sub-region of the target image. Beyond a certain number of sub-regions, the variation of color in the pieces of material may not justify the increased computational cost. In many embodiments, dividing pieces of material into grids of between 5×5 sub-regions and 12×12 sub-regions can significantly increase the photorealism of the mosaic.

Figure 4B:
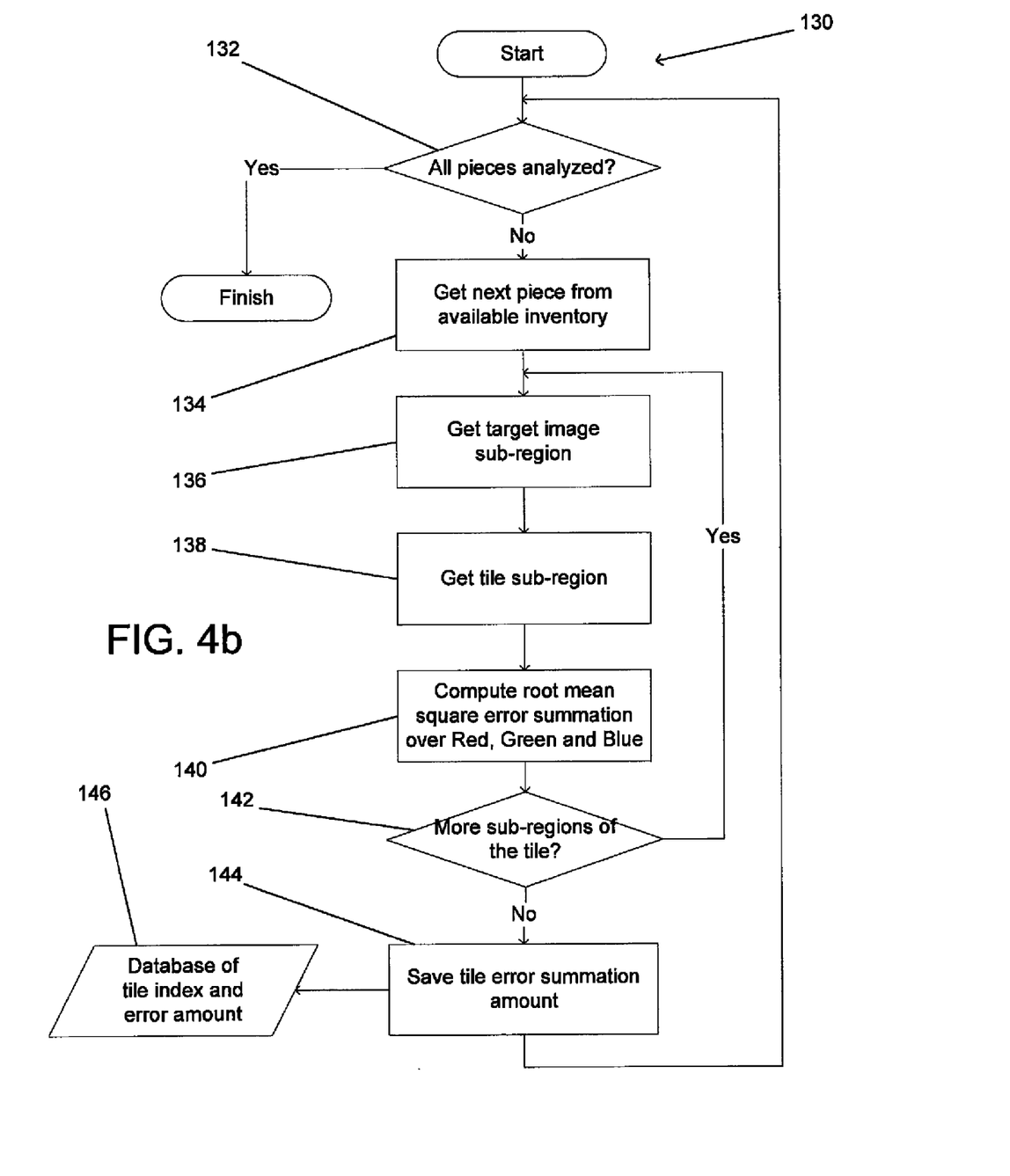

A process for analyzing a target image in accordance with an embodiment of the invention that involves comparison of sub-regions of pieces of material to sub-regions of the target image is shown in FIG. 4b. The process 130 includes analyzing all of the pieces of material. In the inventory (132). The image recorded for each piece of material in the inventory is retrieved and a sub-region of the image is selected. The target image is typically divided up into an integer number of regions, where each region corresponds to the dimensions of a piece of material. Each region can be further sub-divided into sub-regions and then compared to the corresponding sub-region of each piece of material. The comparison process involves obtaining (134) a sub-region from the region of the target image that is being matched against the piece of material and obtaining (138) image information concerning the corresponding sub-region of the piece of material and computing (140) the root mean square error summation over red, green and blue. The process is repeated over all all sub-regions and the sum of the errors for each sub-region are saved in a database. The process repeats each piece of material in the inventory and for or each region in the target image. In many embodiments, the number of comparisons is reduced by limiting the comparisons to a predetermined portion of the inventory based upon characteristics such as material type and/or dimensions of the pieces of material. The number of comparisons can also be decreased where a grey scale comparison can be used or where a RG chromacity color space be used. In many embodiments, the number of comparisons is decreased by indexing the images of pieces of material in a way that reduces the number of comparisons that must be performed in searching for the piece of material with the least root mean square error. Examples of appropriate indexes include, organizing an index based upon the average color of each piece of material and then only looking at the subset of the index that is within a certain distance from the average color of the region of the target image. Another possible index is organizing the pieces of material based upon variation type. For example, pieces of material that have lighter regions in the corner, pieces of material that have a lighter section through the center, and/or pieces of material that have a darker section through the center. In other embodiments, any variety of techniques can be used to simply the process used to locate matching pieces of material within an inventory.

Figure 4C:
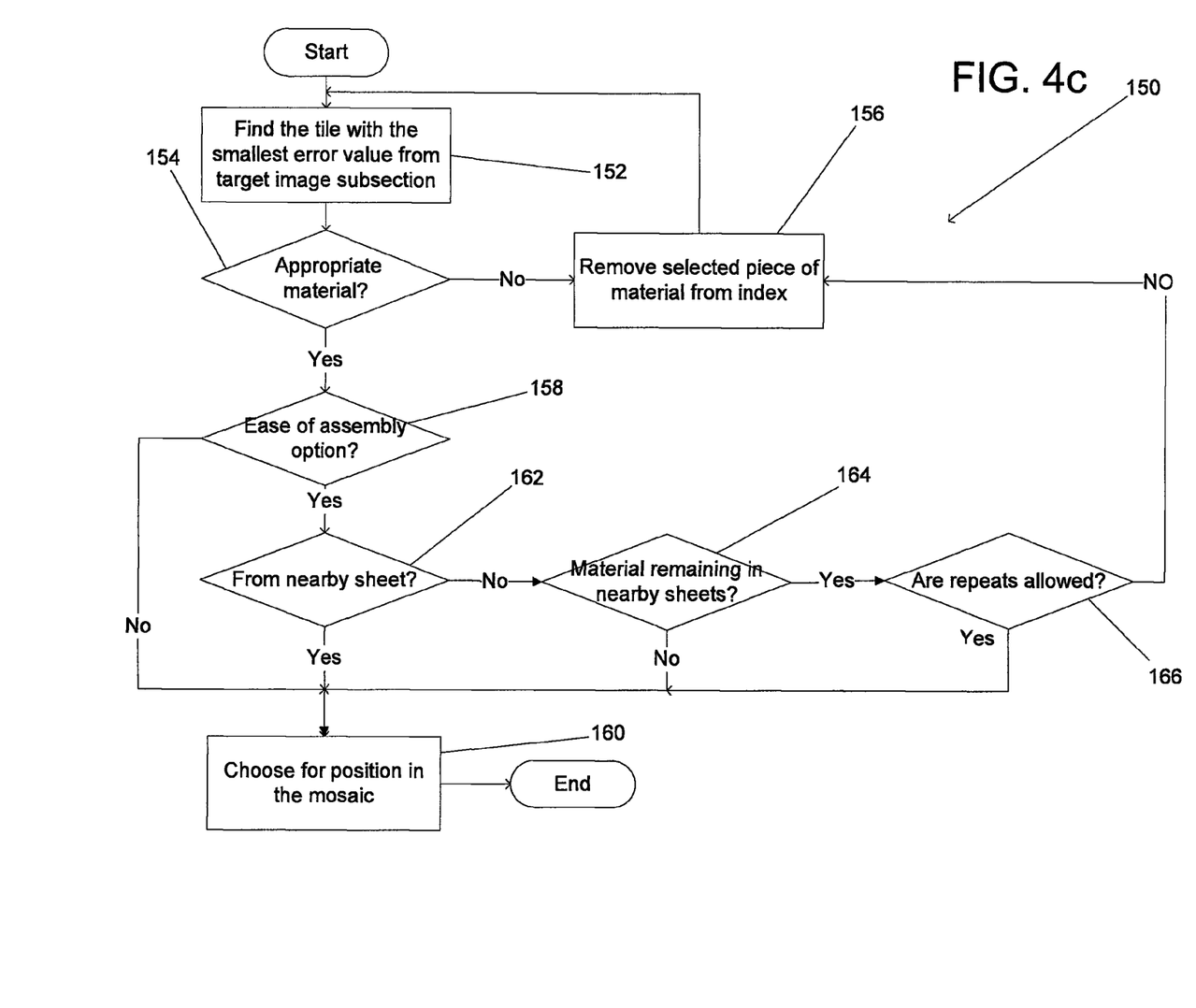

When a comparison is performed between each region of the target image and each appropriate piece of materials, then pieces of material can be selected by finding the match with the lowest error. In this way, a piece that matches well with two regions is assigned to the region that provides the closest match. A process for selecting specific piece of material for a specific sub-region of a target image in accordance with an embodiment of the invention is shown in FIG. 4c. The process (150) includes locating the piece of material with the smallest error value for the target image region in question. A determination (154) is then made as to whether the piece of material is of a type that is appropriate to the particular photorealistic mosaic being constructed. In the event that the piece of material is not of an appropriate type, then the piece of material is removed (156) from the index of available pieces of material and another piece of material is selected. In other embodiments, the inventory is additionally reduced to an appropriate subset to reduce unnecessary computation. When the piece of material is of a type appropriate to the photorealistic mosaic being constructed, then the piece of material is selected (160) as the piece corresponding to the specified sub-region of the target image.

In a number of embodiments, the process for selecting a piece of material to correspond with a region of a target image in a photorealistic mosaic is modified to increase the ease with which the photorealistic mosaic is constructed. When an ease of assembly option (158) is available, then a determination (162) is made as to whether the piece of material is from a sheet from which other pieces of material will be drawn in order to construct the photorealistic mosaic. In the event that the piece of material is from a sheet from which other pieces of material will be drawn, then the piece of material is selected (160). Otherwise, a determination (164) is made as to whether there are many pieces of material remaining on the sheets of material from which other pieces of material will be drawn. In the event that there are not many pieces (the threshold can be determined as is appropriate to the application), then the piece is selected (160). In the event that there are a number of pieces remaining, then the process determines whether repeats of pieces of material are allowed. Repeats are typically allowed when generating a proof image of a mosaic for a project, where the size of the available inventory is insufficient to actually construct the project. In several embodiments, the process is further modified to only allow a finite number of repetitions. When repeats are allowed, the piece is selected (166). Otherwise the piece is removed (156) from the index of available pieces and the process repeats with another piece.

The processes described above rely on an inventory of images of pieces of material that are available to be used in the construction of a photorealistic mosaic. In many embodiments, the pieces of material do not have uniform or symmetric surface patterns. In embodiments where the appearance of a piece of material changes with the orientation of the piece of material, then the selection process can involve rotation of the piece of material and/or the inventory can be supplemented with multiple images of each piece of material, where the piece of material is oriented differently in each image. In a number of embodiments, the orientation of the piece of material is not limited to rotation of the piece of material in one axis. When a material is anisotropic, the material can have properties that depend upon the face of the material that is facing outward from the mosaic. Examples of such materials include, but are not limited to, polarized glass, cubes of material and/or any piece that includes two or more surfaces, where either one of the at least two surfaces could be used as part of a mosaic. Therefore, selection processes in accordance with embodiments of the invention often consider a variety of aspects of orientation, when selecting pieces of material.

Figure 4D:
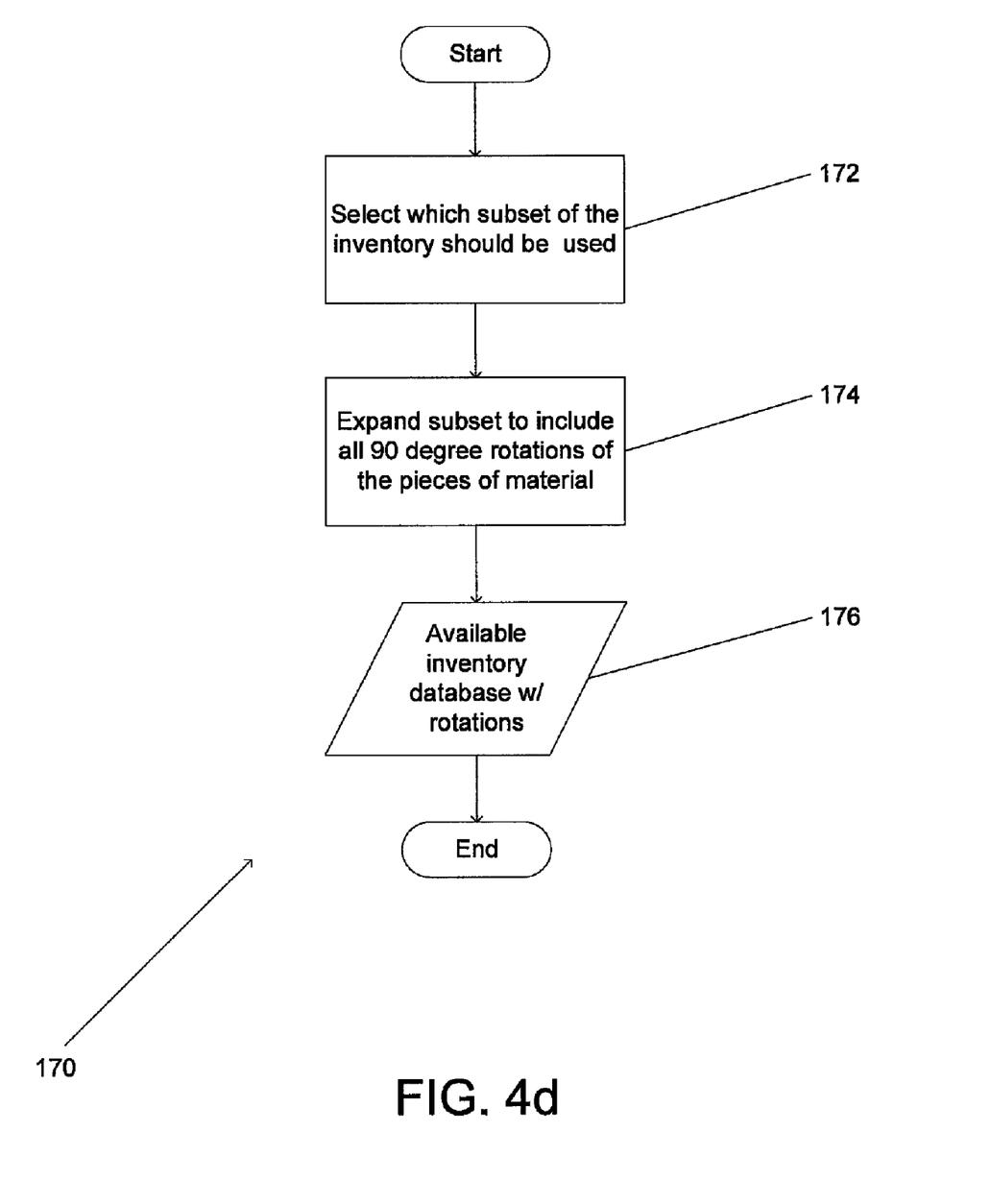

A process for supplementing an inventory of pieces of material with additional images of pieces of material aligned at various orientations in accordance with an embodiment of the invention is illustrated in FIG. 4d. The process 170 includes selecting (172) a subset of the inventory that is to be used in the construction of a photorealistic mosaic (e.g. wood, marble, tile, and/or glass). In the illustrated embodiments, the subset is expanded to include all 90 degree rotations of the pieces of material. In other embodiments, additional orientations of the material can be included. The subset including the rotated images is then included in the inventory used to select pieces of material during the construction of a photorealistic mosaic.

Although a number of specific processes are described above for selecting pieces of material for inclusion in a photorealistic mosaic. Many other processes utilizing known image processing techniques can be used to match pieces of material with regions of a target image in accordance with embodiments of the invention.

Creation of an Assembly Plan

Figure 5:
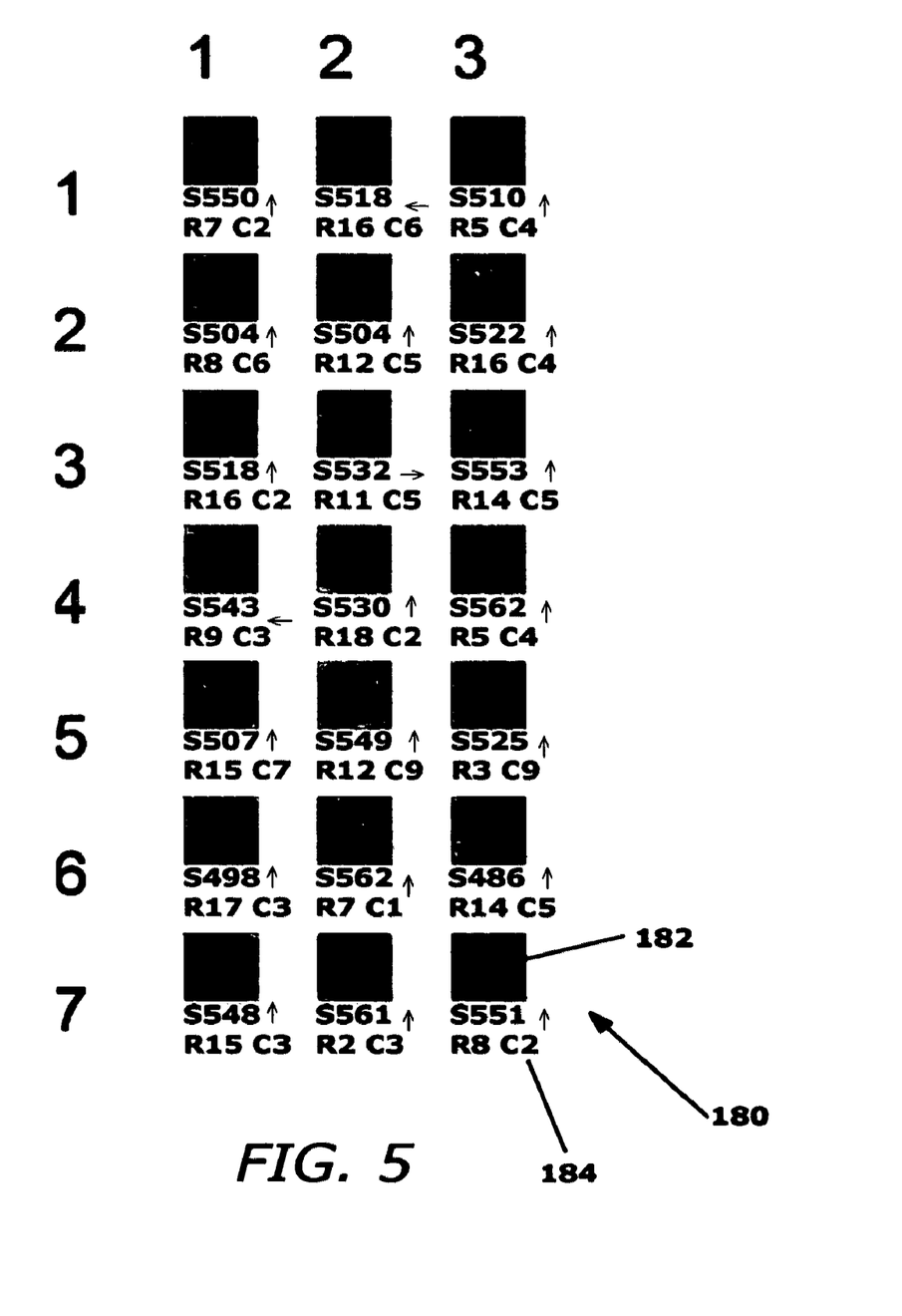
FIG. 5 is an assembly plan for a subsection of a mosaic in accordance with an embodiment of the invention.

As part of the selection of the pieces of material that are to be used in the construction of a photorealistic mosaic, an assembly plan in accordance with an embodiment of the invention can be created. An assembly plan documents the manner in which a photorealistic mosaic is constructed from an inventory of material. The plan typically divides a mosaic into subsections, provides directions for constructing each subsection and directions for combining the subsections into the final mosaic. An embodiment of an assembly plan for a 7 piece by 18 piece mosaic subsection in accordance with an embodiment of the invention is shown in FIG. 5. The assembly plan 180 includes an array of images 182 of pieces of material with information 184 identifying the piece of material and its orientation. Although a specific assembly plan format is shown in FIG. 5, other assembly plans for differently proportioned mosaic subsections can be generated in accordance with embodiments of the invention.

Figure 6:
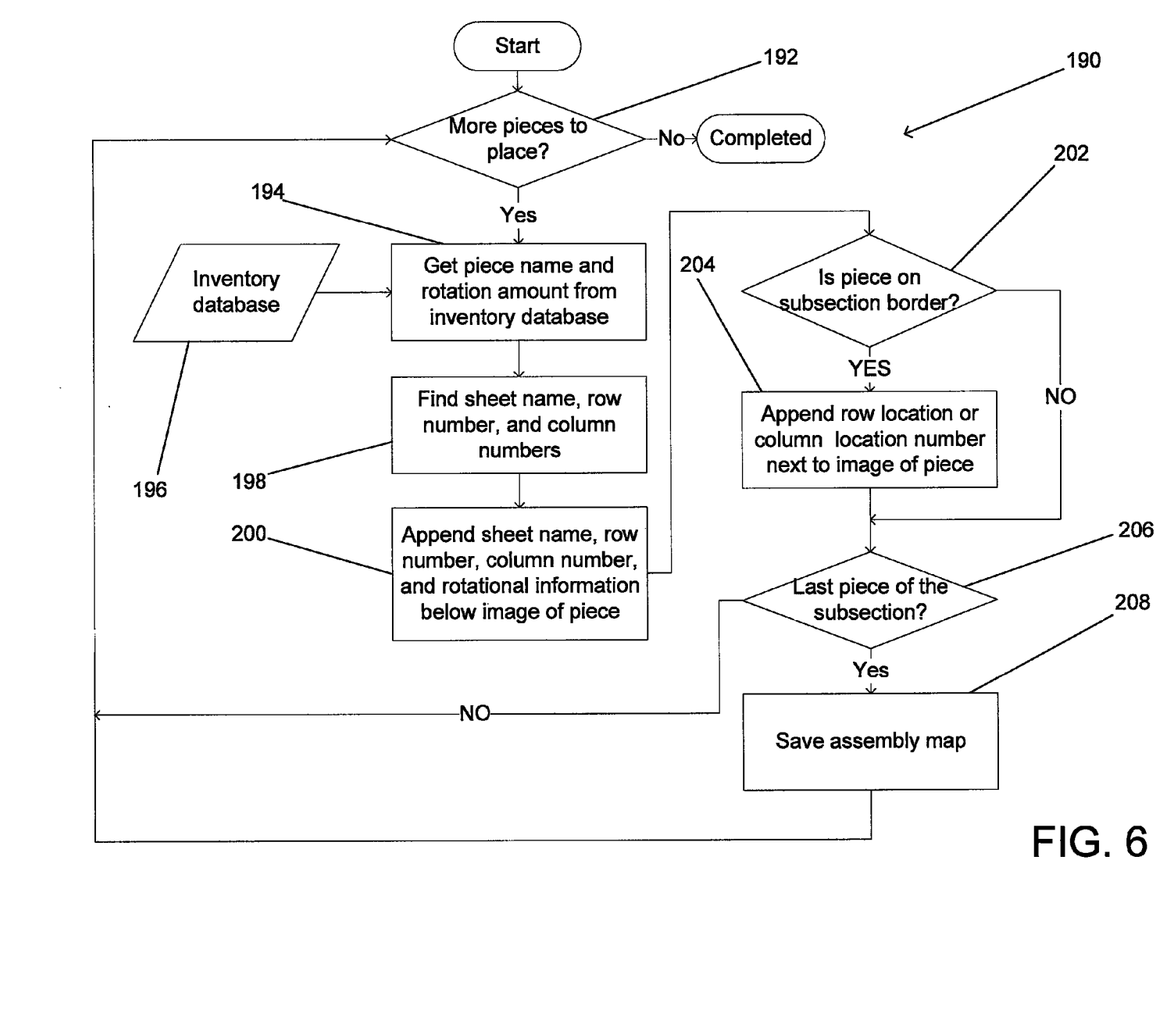
FIG. 6 is a flow chart showing a process for creating an assembly plan in accordance with an embodiment of the invention.

A process for creating an assembly plan in accordance with an embodiment of the invention is illustrated in FIG. 6. The process 190 includes obtaining (194) information identifying the piece of material for a particular region of the photorealistic mosaic and the required rotation of the piece of material. The location of each piece of material within the inventory (196) is also obtained (198). An image of the piece of material is then inserted into the appropriate region in the assembly plan and information concerning the piece of material is appended below the image. In the event (202) that the piece is located at the edge of a row or column of the assembly map, then a row location or column location is appended (204) to the assembly map in an appropriate location. The process repeats until images of all of the required pieces have been added to an assembly map for each subsection of the mosaic. At which point, the assembly maps can be used to construct each subsection of the photorealistic mosaic and an overall assembly map can be used to combine the subsections into the final mosaic. In many embodiments, the assembly plan also includes a list of sheets of pieces of material from the inventory that are used in the assembly. The list can be used to retrieve all of the required sheets prior to assembly of the photorealistic mosaic. Although a specific process is described above, other processes that provide directions for constructing subsections of a mosaic can also be used in accordance with an embodiment of the invention. For example, the assembly process could be a series of instructions for a pick and place robot that would use the instructions to locate pieces of material in the inventory and to place the pieces of material into the mosaic or a subsection of the mosaic.

While the above description contains many specific embodiments of the invention, these should not be construed as limitations on the scope of the invention, but rather as an example of one embodiment thereof. For example, the techniques described above need not be applied to an entire target image. An operator can, for example, select regions of the image that are to be constructed randomly or using pieces of material having uniform color. In addition, photorealistic mosaics in accordance with embodiments of the invention can be constructed on non-planar surfaces and adjustments can be made to the target image to accommodate the non-planar surface and/or to distort the target image to create optical illusions when a photorealistic mosaic is viewed. Accordingly, the scope of the invention should be determined not by the embodiments illustrated, but by the appended claims and their equivalents.

What is claimed is:

1. A process for constructing a photorealistic mosaic of a target image, comprising:
   capturing an image of a sheet that includes a plurality of pieces of material;
   determining the location of each piece of material on the sheet from the captured image;

extracting images of each piece of material on the sheet from the captured image;

storing an image of each piece of material and information concerning the location of the piece of material on the sheet in a database; and using the images in the database and the target image to identify pieces of material to be used in the construction of the photorealistic mosaic.

2. The process of claim 1, wherein the pieces of material are arranged on the sheet in a regular array.

3. The process of claim 1, wherein capturing an image of a sheet of material further comprises capturing an image of the sheet of material using a flat bed scanner.

4. The process of claim 1, wherein capturing an image of a sheet of material further comprises capturing an image of the sheet of material using a digital camera.

5. The process of claim 1, wherein determining the location of each piece of material on the sheet from the captured image further comprises:

creating a segmentation image from the captured image; and determining unique regions within the captured image using the segmentation image.

6. The process of claim 5, wherein determining the location of each piece of material on the sheet from the captured image further comprises:

determining the average area of each unique region;

discarding unique regions that have an area that are less than a predetermined ratio of the average area; and identifying the remaining unique regions as pieces of material.

7. The process of claim 6, wherein extracting images of each piece of material on the sheet from the captured image further comprises:

determining the boundaries of each identified piece of material; and capturing an image that encompasses at least the boundaries of the identified piece of material.

8. The process of claim 6, wherein extracting images of each piece of material on the sheet from the captured image further comprises straightening the image.

9. The process of claim 1, wherein storing an image of each piece of material and information concerning the location of the piece of material on the sheet in a database further comprises storing information in the database concerning the sheet on which the piece of material is located and information identifying the location of the piece of material on the sheet.

10. The process of claim 1, wherein storing an image of each piece of material and information concerning the location of the piece of material on the sheet in a database further comprises storing multiple images of the piece of material, where each image is an image of the piece of material with a different orientation.

11. A process for constructing a photorealistic mosaic of a target image, comprising:

capturing an image of a sheet of a plurality of pieces of material;

determining the location of each piece of material on the sheet from the captured image;

extracting images of each piece of material on the sheet from the captured image;

storing an image of each piece of material and information concerning the location of the piece of material on the sheet in a database;

dividing the target image into an array of regions;

comparing at least a subset of the images in the database with each region by defining sub-regions within each region of the target image and comparing each sub-region with the corresponding portion of the image of each piece of material in the subset;

selecting a piece of material for each region based upon the comparisons; and creating instructions for retrieving pieces of material from an inventory and for placing the pieces of material in the photorealistic mosaic.

* * * * *